July 9, 1946.  W. F. KLEMM  2,403,861
CENTER DRILL
Filed Dec. 18, 1944
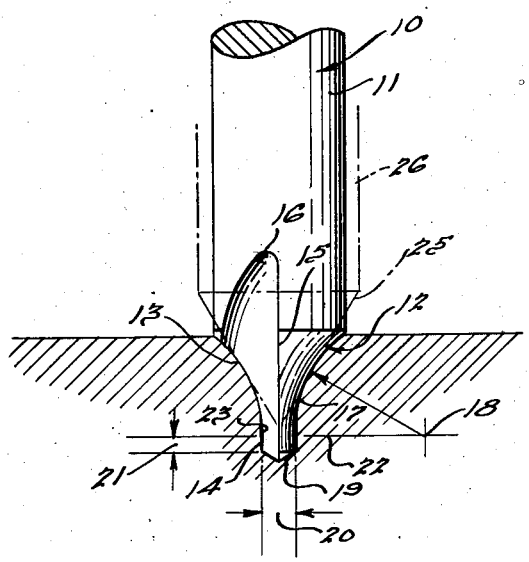
INVENTOR.
William F. Klemm.
BY
Harness, Dickey & Pierce.
ATTORNEYS.

Patented July 9, 1946

2,403,861

UNITED STATES PATENT OFFICE 2,403,861

CENTER DRILL

William F. Klemm, Detroit, Mich.

Application December 18, 1944, Serial No. 568,634

3 Claims. (Cl. 77—66)

This invention relates to center drills and particularly to a center drill in which the cutting portion is formed on a continuous curve providing vertical relief for the end cutting edge of the pilot portion.

Heretofore center drills were provided with a countersinking portion and a pilot portion on the end of the body. The pilot portion was of conventional drill construction extending from the end of a frusto-conical countersinking portion which machined the hole drilled by the pilot to a desired taper. Difficulty was experienced when employing this type of center drill due to the small pilot portion becoming heated and expanding in the hole causing it to become broken by the applied torque. When the break occurred across the small pilot portion, it was difficult to remove the broken part because of its being wedged in the hole. Various attempts were made to construct center drills in some manner to overcome this difficulty and some improved center drills have resulted from this effort.

In practicing the present invention, a center drill is formed by constructing the countersinking and pilot portions in smooth continuous sections which blend with each other to have the side cutting edges disposed in smooth continuous curves. Preferably the curves are arcs of a circle struck from a center disposed above the end of the pilot portion to have the cutting end of the pilot portion of greater diameter than the portion directly thereabove. This not only provides a simple curve upon which the side cutting edges are ground and relieved, but vertical relief is provided to the bottom cutting edges of the pilot portion. When the center drill becomes heated during the operation, the body portion of the pilot portion cannot expand sufficiently to engage the side of the hole cut by the end cutting edges, and breakage from this cause is eliminated. The relief above the end cutting edge of the pilot portion is useful in providing chip clearance which permits the free movement of the chips upwardly in the flutes of the portions. Should the pilot portion become broken, the clearance above the bottom cutting edges permits the broken end to be easily removed from the drilled hole.

Accordingly, the main objects of the invention are: to provide a center drill with cutting portions having the side cutting edges disposed in smooth curves; to provide a center drill with countersinking and pilot portions which blend into each other on a smooth curve; to provide a pilot portion for a center drill with vertical relief above the end cutting edges and with side cutting edges which are disposed on a continuous curve with the cutting edges on the countersinking portion of the drill; to construct a center drill by grinding the side cutting edges on a true arc struck from a center disposed above the end cutting edges of the pilot portion and providing radial relief to the side cutting edges and vertical relief to the bottom cutting edges; and in general to provide a center drill which is simple in construction and economical of manufacture.

Other objects and features of novelty of the invention will be specifically pointed out or will become apparent when referring, for a better understanding of the invention, to the following description taken in conjunction with the accompanying drawing wherein the single figure discloses a center drill embodying features of this invention and a workpiece having a center drilled thereby.

A center drill 10 is illustrated having a body portion 11 and a cutting portion 12. The cutting portion is made up of a countersinking portion 13 and a pilot portion 14 which blend into each other. Cutting edges 15 are provided in the countersinking and pilot portions by the flutes 16 machined therein to project into the body portion. The cutting edges 15 are struck from an arc 17 about a center 18 which is disposed above the end cutting edges 19 of the drill section. The distance 21 above the bottom cutting edges 19 of the pilot portion 14 is substantially equal to half the diameter 20 of the pilot portion, that is to say, substantially equal to its radius. The portion of the center drill disposed on the line 22 upon which the center 18 is located is of the smallest diameter. The portions of the center drill above and below the line 22 are of increasingly larger diameters.

Relief is provided to the cutting edges 15 in the regular manner by tilting the tool toward the grinding element rearwardly of the cutting edges as the grinding element is oscillated across the countersinking and pilot portions about the center 18. Vertical relief will be provided in the hole 23 cut by the pilot portion the same distance above the line 22 that the end cutting edges 19 are disposed below the line. This vertical clearance above the end cutting edges 19 prevents the heat generated in the cutting portions of the center drill from expanding the pilot portion a sufficient amount to cause it to bind within the hole. The breakage which normally occurs due to the expansion of the pilot portion is thereby eliminated and should the pilot portion become broken the clearance above the end cutting edges 19 will permit the operator to quickly remove the broken portion thereof. The clearance is further useful in permitting free movement of the chips from the hole upwardly in the flutes 16 in the body portion and in the countersinking and pilot portions.

The arcuate countersinking portion of the hole readily receives the tapered end 25 of a center 26 and the circular line of engagement therebetween will be coined into a band of a width conforming to the amount of pressure applied between the center 26 and the work. The band prevents the drifting of the center and work relative to each other and is available after a hardening operation to accurately center the workpiece without the requirement of a separate grinding operation which is employed to re-locate the center after the hardening operation.

What is claimed is:

1. A center drill having a body portion, a countersinking portion extending from said body portion, a pilot portion extending from said countersinking portion having an end cutting portion, said portions having at least one flute therein, the section above said end cutting portion and below said countersinking portion being of less diameter than said end cutting portion to provide relief therefor.

2. A center drill having a body portion, a countersinking portion extending from said body portion, a pilot portion extending from said countersinking portion having an end cutting portion, said portions having at least one flute therein, the section above said end cutting portion and below said countersinking portion being of less diameter than said end cutting portion to provide relief therefor, said countersinking portion and said pilot portion being joined on a smooth curve.

3. A center drill having a body portion, a countersinking portion extending from said body portion, a pilot portion extending from said countersinking portion having an end cutting portion, said portions having at least one flute therein, the section above said end cutting portion and below said countersinking portion being of less diameter than said end cutting portion to provide relief therefor, the form of said countersinking portion and said pilot portion being such that a plane in the longitudinal axis of said body portion intersects said portions on an arc of a circle struck from a center located in said plane and spaced from the end cutting portion toward said countersinking portion.

WM. F. KLEMM.